March 30, 1965 U. S. BERGER 3,176,226

ELIMINATION OF FREQUENCY SHIFT IN SUPPRESSED CARRIER SYSTEMS

Filed Nov. 28, 1961 2 Sheets-Sheet 1

INVENTOR
U. S. BERGER
BY R. B. Ardis
ATTORNEY

ELIMINATION OF FREQUENCY SHIFT IN SUPPRESSED CARRIER SYSTEMS

Filed Nov. 28, 1961

INVENTOR
U. S. BERGER
BY R. B. Ardis
ATTORNEY

United States Patent Office 3,176,226

Patented Mar. 30, 1965

3,176,226

ELIMINATION OF FREQUENCY SHIFT IN SUPPRESSED CARRIER SYSTEMS

Uriah S. Berger, Andover, Mass., assignor to Bell Telephone Laboratories, Incorporated, New York, N.Y., a corporation of New York Filed Nov. 28, 1961, Ser. No. 155,381

3 Claims. (Cl. 325—49)

Figure 1:
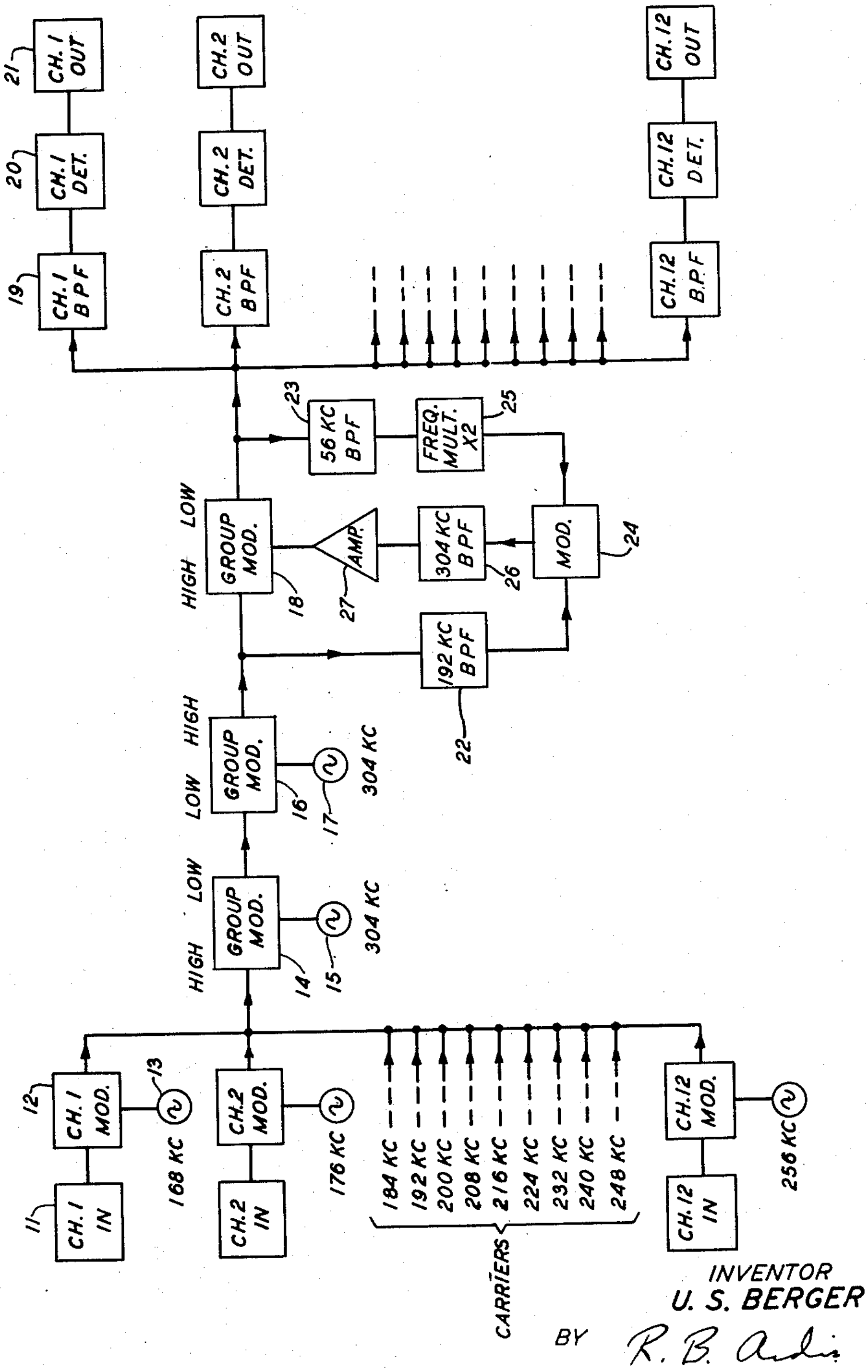

This invention relates generally to the transmission of signals by amplitude modulation techniques and more particularly to suppressed-carrier amplitude modulation signal transmission over media which tend to introduce uncontrolled frequency shifts.

When either or both of the sidebands of an amplitude modulated wave are transmitted over a medium which introduces a frequency shift, the received signal is likely to be distorted if a carrier wave equal to the original carrier wave in frequency is used to accomplish demodulation. Under such conditions, the sidebands may undergo frequency changes not shared by the carrier and the demodulated signal is likely to incur not only frequency error but also quality degradation due to misalignment with receiving band filters. In the past, such distortions have been avoided by transmitting the carrier at full or reduced amplitude along with the sidebands, by manual adjustment of the demodulating carrier to cancel the frequency shift, or by taking special measures to keep the amount of frequency shift introduced by the transmission system within narrow limits.

There are, however, a number of reasons why none of these expedients may be desirable. Transmission of carrier at full amplitude may, for example, overload repeaters in the transmission system or cause crosstalk between adjacent lines, while transmission of carrier at reduced amplitude may lead to filtering difficulties in separating the carrier at the receiving end of the system for amplification prior to demodulation. Manual adjustment of the demodulating carrier frequency, on the other hand, requires a separate adjustment for every change in operating conditions. Controlling the frequency shift introduced by the transmission system within narrow limits, finally, tends to require relatively complex and expensive apparatus and is subject to failure in the event of failure of any portion of the controlling mechanism.

A principal object of the invention is, therefore, to eliminate frequency errors in the transmission of suppressed-carrier amplitude modulated waves without requiring either manual adjustments or measures to limit the amount of frequency shift in the transmitting medium.

A closely related object is to eliminate frequency error in the transmission of suppressed-carrier amplitude modulated waves in as simple and reliable a manner as possible.

A typical amplitude modulation transmission system which tends occasionally to introduce a small amount of frequency deviation is the standard short-haul Bell System carrier telephone transmission system known as type N carrier. This system, shown in outline form, for example, in United States Patent 2,695,332, which issued November 23, 1954, to R. S. Caruthers, uses suppressed-carrier single-sideband techniques to transmit whole groups of double-sideband carrier-transmitted channel signals. Repeaters are spaced periodically throughout the system and, at each repeater point, a local group carrier frequency is generated to modulate (or demodulate, depending upon the point of view) the group either from a low frequency band to a higher frequency band or vice versa. Such alternation and inversion of channel groups between low and high frequency bands is known in the art as frequency frogging and tends to equalize noise and crosstalk in the individual signal channels. Any instability or inaccuracy in the locally generated group carrier frequencies, however, will result in a frequency shift that is cumulative throughout the system. If it reaches an order of magnitude of 100 cycles per second, it can result in degradation of channel frequency characteristics because of misalignment of the received frequency spectrum with respect to the receiving channel band filters. In addition, while the frequency shift may be otherwise tolerable for normal transmission of carrier-transmitted channel signals, it may not be acceptable for program and certain types of data signals which are not accompanied by their own carrier and hence require more faithful reproduction of frequency.

In accordance with the invention, the final group demodulating carrier in such a system as the type N carrier system is derived, not from a local oscillator, but rather by frequency multiplication and intermodulation techniques from a pair of pilot frequencies which are within the pass band of the system. When the system is used to transmit groups of double-sideband carrier-transmitted channel signals, these pilot frequencies may be and preferably are two of the individual channel carriers. At the final group demodulator, which is otherwise like the preceding group modulators except that it is the last one in the system, the demodulating carrier derived from these pilot frequencies in accordance with the invention has exactly the frequency required to eliminate all of the frequency error accumulated at previous repeater points.

In completely eliminating accumulated frequency error on the final group demodulator, the invention thus eliminates any need either for transmitting the group carrier frequencies or for employing elaborate control schemes for holding frequency shift to an acceptable level. In practice, the invention is simple in that it requires a minimum amount of additional circuitry and reliable in that it does not rely upon elaborate control apparatus which is subject to failure. It is, moreover, self-correcting in that it insures the correct demodulating group carrier frequency at all times and does not require manual adjustments. It provides, in short, the advantages of actual transmission of the carrier frequency without incurring the usual penalties.

In a number of important embodiment of the invention, the pilot frequencies which are used to derive the final demodulating group carrier are harmonically related to one another when in either the high group or the low group, in the sense that they are harmonics of a common fundamental frequency, and the received pilot frequencies are multiplied in frequency by the factors $m$ and $n$ in deriving the demodulating carrier, where $m$ and $n$ are integers greater than zero and satisfy the relation $$m=n+1$$

The greatest simplicity in deriving the final group demodulating carrier is thereby assured.

Figure 4:
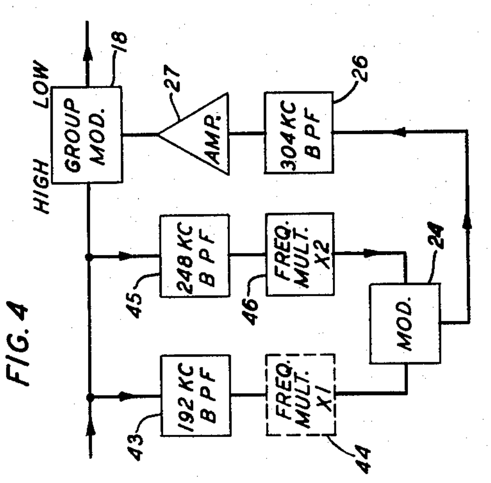
Figure 3:
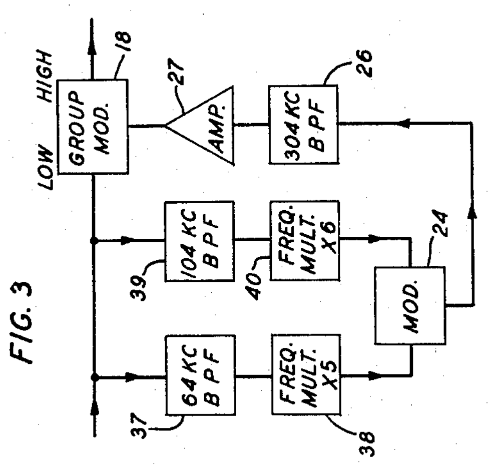
Figure 2:
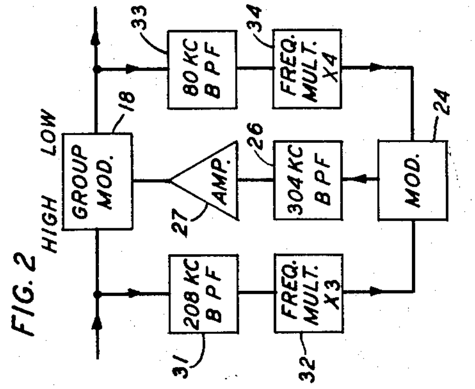
Figure 5:
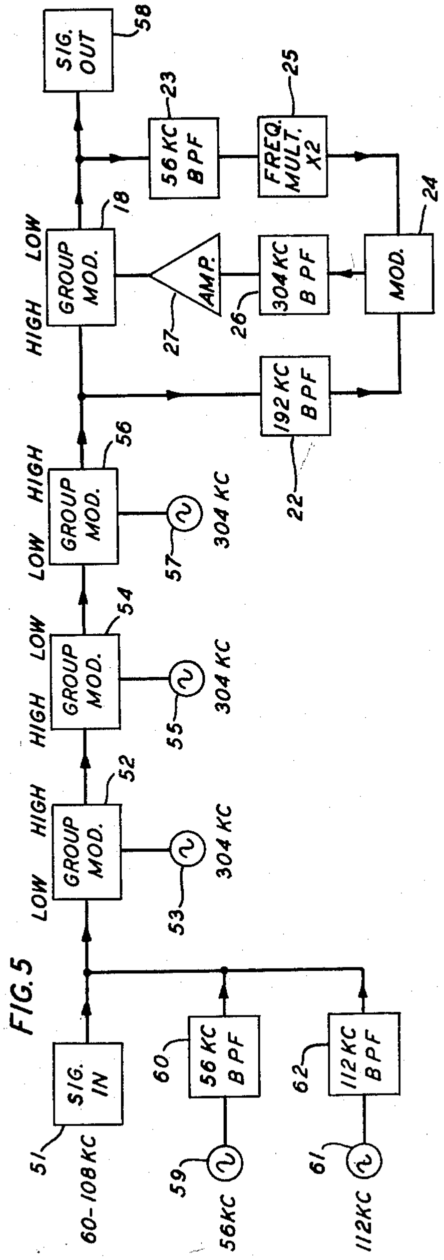

A more complete understanding of the invention, along with other objects and features, may be obtained from a study of the following detailed description of several specific embodiments. In the drawings:

FIG. 1 is a block diagram of a typical N carrier system embodying the invention arranged to transmit a group of twelve carrier-transmitted double-sideband channel signals;

FIGS. 2, 3, and 4 are block diagrams of alternative final repeaters for the embodiment of the invention illustrated in FIG. 1; and FIG. 5 is a block diagram of a typical N carrier system embodying the invention arranged to transmit a single broadband signal channel.

FIG. 1 illustrates one direction of transmission of a typical type N carrier system modified to operate in accordance with the principles of the invention. The type N system operates on a four-wire basis, requiring a similar arrangement for transmission in the reverse direction. The circuitry required to provide the second path is not illustrated, however, since it would merely be a substantial duplication of that shown. In addition, some filters, amplifiers, and other component circuits are not separately illustrated where separate illustration is not necessary for an understanding of the invention. It is to be understood, however, that in reality they are included within appropriate ones of the blocks termed "modulator," "input circuit," and "output circuit."

For normal telephone message transmission, the type N is, as shown, a twelve channel system. The first channel includes, for example, an appropriate input circuit 11 which supplies voice-frequency signal waves occupying a band of approximately 300 to 3100 cycles to a channel modulator 12. Modulator 12 is supplied with its carrier frequency by a carrier source 13. The other channels are similar, except for the channel carrier frequency employed, and will not be separately described.

Through the use of different carrier frequencies, the twelve channels are combined for transmission on a frequency-division multiplex basis. In the type N system, the carriers are spaced at 8-kilocycle intervals. These may be spaced, as illustrated, from 168 to 256 kilocycles to form a so-called high group or from 48 to 136 kilocycles to form a so-called low group. In each channel, the carrier and both upper and lower sidebands are transmitted.

Repeaters in the type N system employ suppressed carrier single-sideband techniques to alternate the transmitted frequencies between a high band of from 164 to 260 kilocycles and a low band of from 44 to 140 kilocycles at successive repeater points and invert the frequency order at each point. As pointed out previously, this combination of frequency reversal and inversion is known as frogging and serves to equalize noise and crosstalk in the various signal channels. The repeaters are spaced at regular intervals in the system, the particular spacing employed depending principally upon cable gauge. Each repeater normally includes a group modulator (so-called to distinguish it from the channel modulators), a local source of carrier current having a nominal frequency of 304 kilocycles, and the appropriate amplifiers and filters. Three repeaters are shown in FIG. 1 by way of example. The first is shown comprising a group modulator 14 and a local nominal 304 kilocycle carrier source 15 and the second is shown comprising a group modulator 16 and a local 304 kilocycle carrier source 17. As explained previously, each block labeled "group modulator" includes the appropriate filters and amplifiers for single-sideband carrier-suppressed transmission of the group frequencies. At the last repeater point in FIG. 1, the group modulator 18 accomplishes the final step of frequency frogging prior to detection of the various channel signals and, hence, can be said to perform the function of group demodulation. In accordance with the present invention, group modulator 18 has its demodulating carrier frequency derived in such a manner that all frequency shift due to inaccuracies of group carrier oscillators 15 and 17 is eliminated.

The first type N carrier signal channel in FIG. 1 is completed, to the right of final group modulator 18, by an appropriate bandpass channel filter 19, a channel detector 20, and a channel output circuit 21. The remaining channels are completed in a similar manner, differing in the pass bands of their chanel filters in order to separate the various signal channels. Since the carrier and both sidebands of the signal channels are received, no local demodulating carrier source is required.

Unwanted frequency deviation creeps into a type N carrier system whenever one or more of the group carrier oscillators at repeater points drifts from its assigned nominal frequency of 304 kilocycles. As one of these carrier oscillators drifts, the sideband frequencies transmitted from the associated group modulator drifts in the same direction. Successive carrier deviations along the repeatered line cause successive frequency errors in the transmitted sidebands which, if they combine additively, can introduce a substantial frequency error in the group frequencies supplied to the receiving channel filters from the final repeater. This frequency error tends to cause degradation in channel frequency characteristics because of misalignment of the incoming frequency spectrum with respect to the receiving channel filters.

In the embodiment of the invention illustrated in FIG. 1, such frequency errors are canceled completely at the final repeater point by deriving the final demodulating carrier frequency for group modulator 18 from two of the received channel carriers. In the arrangement shown, the two channel carriers used are 192 kilocycles from the high group and 56 kilocycles from the low group. Since the 192 kilocycle carrier has a frequency of 112 kilocycles in the low group, these two carriers are in a 2 to 1 harmonic relationship when in that band. A narrow band 192 kilocycle filter 22 is bridged across the line on the input or high group side of group modulator 18 and a narrow band 56 kilocycle filter 23 is similarly bridged across the line on the output or low group side. Both filters have pass bands wide enough to pass the chosen channel carriers even if shifted in frequency by the maximum anticipated amount but narrow enough to exclude as many other frequencies as possible. Both filters 22 and 23 are connected to a local modulator 24, filter 22 directly and filter 23 through a frequency multiplying circuit 25. Circuit 25 doubles the frequency of the wave applied to it by filter 23. The sum modulation product of modulator 24 is selected by a 304 kilocycle band-pass filter 26 and amplified by an amplifier 27 before it is applied as the demodulating group carrier frequency to group modulator 18.

The effectiveness of the frequency error cancellation afforded by the invention can be illustrated by a numerical example. The normal group demodulating wave frequency is 304 kilocycles and the selected channel carrier frequencies are 56 and 112 kilocycles. Since group modulator 18 is shown to be one providing a transition from the high band to the low band rather than vice versa, these carriers on the input side of group modulator 18 are $(304-56+D)$ and $(304-112+D)$ or $(248+D)$ kilocycles and $(192+D)$ kilocycles, where D is the accumulated frequency deviation from the preceding repeaters. The frequency $(192+D)$ kilocycles is selected by filter 22 and applied to modulator 24. On the output side of group modulator 18, the frequency $(P-248-D)$ kilocycles is selected by filter 23, where P is the demodulating frequency applied to group modulator 18 from amplifier 27. Modulator 24 combines these two frequencies to yield the sum product $(192+D+2P-496-2D)$ kilocycles or $(2P-D-304)$ kilocycles. Since this is the frequency selected by filter 26 and applied as the demodulating carrier to group modulator 18, $$P=2P-D-304$$

Solved for P, this equation yields $$P=304+D$$

A demodulating carrier is thus applied to group modulator 18 which includes the precise frequency deviation D that has been acquired by the selected channel carriers and by all of the other transmitted frequencies. In this example, the two channel carriers of interest are demodulated by group modulator 18 as follows:

$$(304+D)-(248+D)=56 \text{ kilocycles}$$

$$(304+D)-(192+D)=112 \text{ kilocycles}$$

All of the accumulated frequency deviation D has been canceled in the final group modulator 18, whether it was 1 cycle or 100 cycles.

Although the selected low band channel carrier frequencies in the embodiment of the invention illustrated in FIG. 1 are 56 and 112 kilocycles, other combinations may be used as well. Examples are 40 and 80 kilocycles, 48 and 96 kilocycles, 64 and 128 kilocycles, and 52 and 104 kilocycles.

The particular arrangement illustrated in FIG. 1, in which the 192 kilocycle high band channel carrier is applied directly to modulator 24 is, of course, a special case. The 192 kilocycle wave is, in a sense, multiplied in frequency by the factor 1. A somewhat more general case is illustrated in FIG. 2, which shows a final type N carrier repeater embodying the invention in which a 208 kilocycle channel carrier in the high group is multiplied in frequency by 3 and an 80 kilocycle channel carrier in the low group is multiplied in frequency by 4. As illustrated, a 208 kilocycle bandpass filter 31 is bridged across the input side of final group modulator 18 and connected to modulator 24 through a frequency multiplying circuit 32 arranged to multiply the selected wave in frequency by the factor 3. On the output side of group modulator 18, an 80 kilocycle band filter 33 is connected from the line to modulator 24 by a frequency multiplying circuit 34 arranged to multiply by the factor 4. The 304 kilocycle filter 26 connected to the output of modulator 24 selects the difference product to provide the correct demodulating frequency for canceling accumulated frequency error.

It is, furthermore, not essential to the invention that the two channel carriers be selected from opposite sides of final group modulator 18. FIGS. 3 and 4 illustrate embodiments of the invention where both channel carriers are selected from the input side of group modulator 18. For purposes of illustration, the repeater in FIG. 3 is of the low-high type while in FIG. 4 it is of the high-low type.

In the low-high repeater shown in FIG. 3, the selected channel carriers are in the low group and have normal frequencies of 64 and 104 kilocycles. A 64 kilocycle band filter 37 and a frequency multiplying circuit 38 for multiplying an incoming frequency by a factor of 5 are connected in tandem between the line and modulator 24 Similarly connected are a 104 kilocycle band filter 39 and a frequency multiplying circuit 40 for multiplying the incoming frequency of a factor of 6. The output 304 kilocycle filter 26 selects the difference frequency to provide a demodulating carrier which contains the frequency deviation of the two channel carriers and is exactly correct in frequency to cancel all accumulated frequency error in the transmitted group signals.

The high-low repeater illustrated in FIG. 4 can be used as a basis for a large number of different channel carrier frequencies and frequency multiplying factor examples. Two channel carriers from the high group are used and the multiplying factors can be taken as *m* and *n*, which are any integers greater than zero satisfying the relation $$m=n+1$$

A first band filter 43 and frequency multiplier 44 combination is connected from the input side of group modulator 18 to one input of modulator 24. Frequency multiplier 44 is shown only in dashed outline form for the reason that the multiplying factor is unity in that path for the particular combination of channel carrier frequencies illustrated in FIG. 4. A second band filter 45 and frequency multiplier 46 combination is connected from the same side of group modulator 18 to the other input of modulator 24.

If the high band channel carrier frequency selected by filter 45 is designated A, the frequency multiplying factor of frequency multiplier 46 is *m*, the high band channel carrier frequency selected by filter 43 is designated B, and the factor of frequency multiplier 44 is *n*, a number of effective combinations are shown in the following table:

| A | m | B | n | mA | nB |
|---|---|---|---|---|---|
| *Kc.* | | *Kc.* | | *Kc.* | *Kc.* |
| 240 | 3 | 208 | 2 | 720 | 416 |
| 232 | 4 | 208 | 3 | 928 | 624 |
| 240 | 2 | 176 | 1 | 480 | 176 |
| 248 | 2 | 192 | 1 | 496 | 192 |
| 256 | 2 | 208 | 1 | 512 | 208 |
| 252 | 2 | 200 | 1 | 504 | 200 |

The last four examples are particularly attractive because they require only a single frequency doubler in addition to the filters and modulator 24 to generate the demodulating carrier.

While the basic embodiment of the invention illustrated in FIG. 1 makes use of the channel carriers already transmitted in the standard type N carrier telephone system, the principles underlying the invention are of sufficient breadth that their applicability is much greater. It is occassionally desirable, for example, to transmit a different type of signal over a repeatered type N carrier transmission line. FIG. 5 illustrates an embodiment of the invention in which the transmitted signal does not include channel carriers and in which a pair of pilot frequencies are used to generate the demodulating carrier wave instead. The transmitted signal may be, for example, a broadband data signal or a group of suppressed-carrier single sideband channels. As in FIG. 1, only one direction of transmission is shown.

In FIG. 5, a signal input circuit 51 supplies a broadband signal occupying a band extending from 60 to 108 kilocycles to a repeatered N carrier line. The first repeater contains a low-high group modulator 52 supplied with carrier from a local nominal 304 kilocycle source 53. The second repeater contains a high-low group modulator 54 and a carrier source 55, while the third contains a low-high group modulator 56 supplied from a carrier source 57. A larger or smaller number of repeaters may be employed, of course, depending upon the length of the line and the gauge of the cable, but these are shown by way of example. The final repeater contains a high-low group modulator 18 supplied with a demodulated carrier wave in accordance with the invention and furnishes the original 60 to 108 kilocycle signal to a signal output 58.

In accordance with the invention, a pair of pilot frequencies outside of the signal band but still within the pass band of the transmission system are introduced along with the signal band. In the embodiment illustrated in FIG. 5, the two pilot frequencies are 56 and 112 kilocycles. As illustrated, a 56 kilocycle source 59 is coupled to the line through a 56 kilocycle bandpass filter 60 and a 112 kilocycle source 61 is coupled to the line through a 112 kilocycle bandpass filter 62. These pilot frequencies are frogged up and down in frequency along with the main signal at each repeater point and accumulate the same frequency shift as the signal. At the final repeater, the demodulating carrier is supplied to group modulator 18 by a circuit combination substantially identical to the one shown in FIG. 1. The 56 kilocycle pilot frequency from the low group side of group modulator 18 is doubled in frequency and supplied to modulator 24 along with the 192 kilocycle pilot from the high group side. The output filter 26 selects the sum product from modulator 24 and supplies it, through amplifier 27, to group modulator 18 as the demodulating carrier. As has already been explained, this carrier is precisely the frequency required to cancel all of the accumulated frequency error.

It is to be understood that the above-described arrangements are illustrative of the application of the principles of the invention. Numerous other arrangements may be devised by those skilled in the art without departing from the spirit and scope of the invention.

What is claimed is:

1. In a suppressed-carrier amplitude modulation signal transmission system having a transmitting end and a receiving end, an arrangement for eliminating frequency error which comprises means to transmit a pair of pilot frequencies over said system along with the regular signal from the transmitting end to the receiving end, said pilot frequencies being harmonically related to one another, a demodulator at the receiving end of said system, means to select said pilot frequencies at the receiving end of said system, means to multiply one of said pilot frequencies in frequency by the factor *m* and the other by the factor *n*, where *m* and *n* are integers greater than zero satisfying the relation $m=n+1$, a second order modulator and a means to derive a demodulating carrier for said demodulator by intermodulating said pilot frequencies with one another in said second order modulator subsequent to multiplication.

2. In a suppressed-carrier amplitude modulation system for transmitting a group of double-sideband carrier-transmitted signals from a transmitting station to a receiving station, an arrangement for eliminating frequency error which comprises a demodulator at said receiving station, means to select a pair of signal carrier frequencies at said receiving station, said selected signal carrier frequencies being substantially harmonically related to one another, means to multiply one of said selected carrier frequencies in frequency by the factor *m* and the other by the factor *n*, where *m* and *n* are integers greater than zero satisfying the relation $m=n+1$, a second order modulator, and means to derive a demodulating carrier for said demodulator by intermodulating said selected carrier frequencies with one another in said second order modulator to multiplication.

3. In a suppressed-carrier amplitude modulation signal transmission system for transmitting signals having a predetermined frequency band from a transmitting station to a receiving station, an arrangement for eliminating frequency error which comprises means to transmit a pair of pilot frequencies outside of said predetermined frequency band but within the pass band of said system over said system along with the regular signals from the transmitting end to the receiving end, a demodulator at said receiving station, means to select said pilot frequencies at said receiving station, means to multiply one of said pilot frequencies in frequency by the factor *m* and the other by the factor *n*, where *m* and *n* are intergers greater than zero satisfying tht relation $m=n+1$, a second order modulator, and means to derive a demodulating carrier for said demodulator by intermodulating said selected pilot frequencies with one another in said second order modulator subsequent to multiplication.

References Cited by the Examiner

UNITED STATES PATENTS 2,778,877 1/57 Caruthers ------------ 195—15

DAVID G. REDINBAUGH, *Primary Examiner.*